United States Patent [19]
Hopkins

[11] 3,868,752
[45] Mar. 4, 1975

[54] CUTTING TOOL

[75] Inventor: David Alan Hopkins, Detroit, Mich.

[73] Assignee: The Valeron Corporation, Detroit, Mich.

[22] Filed: Nov. 16, 1973

[21] Appl. No.: 416,446

[52] U.S. Cl. ............................................. 29/105 A
[51] Int. Cl. ............................................. B26d 1/12
[58] Field of Search ...................... 29/105 R, 105 A

[56] References Cited
UNITED STATES PATENTS

| | | | |
|---|---|---|---|
| 3,217,384 | 11/1965 | Wirfelt | 29/105 |
| 3,300,834 | 1/1967 | Stone | 29/105 |
| 3,405,433 | 10/1968 | Williams | 29/105 |
| 3,512,236 | 5/1970 | Renaud | 29/105 |
| 3,616,507 | 11/1971 | Wirfelt | 29/105 |
| 3,757,397 | 9/1973 | Lindsay | 29/105 |

FOREIGN PATENTS OR APPLICATIONS

| | | | |
|---|---|---|---|
| 2,016,193 | 10/1970 | Germany | 29/105 R |

*Primary Examiner*—Andrew R. Juhasz
*Assistant Examiner*—W. R. Briggs
*Attorney, Agent, or Firm*—Farley, Forster and Farley

[57] ABSTRACT

A multiple indexable insert milling cutter of extremely simple precise construction providing unusual economy of manufacture. The tool includes a circumferential groove having a pair of angularly related insert locating surfaces and a back up or seat for each insert comprising a simple flat plate positioned in a slot transverse to the groove. The seating face of the plate positions a positive rake insert and a negative radial rake angle sufficient to provide flank as distinguished from insert cutting edge contact with the divergent locating surfaces of the groove. In the preferred embodiment conical locating surfaces defining a "V" groove engage triangular insert sides with line contact along two conical elements having a slightly greater than 60° angular relationship in an axial-radial plane intersection with said groove.

10 Claims, 4 Drawing Figures

PATENTED MAR 4 1975　　　　　　　　　　　　　　　3,868,752
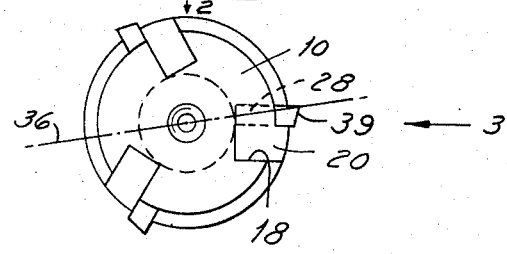
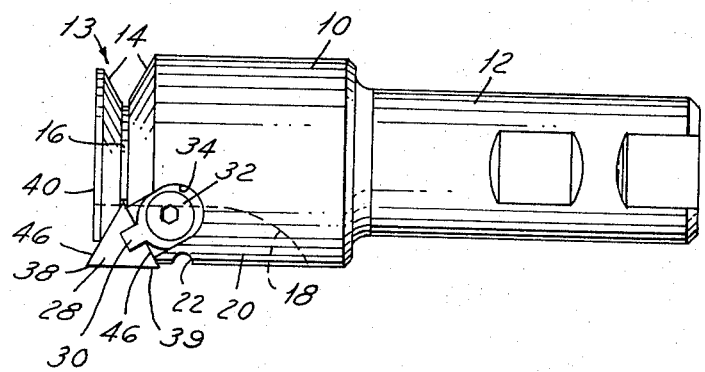
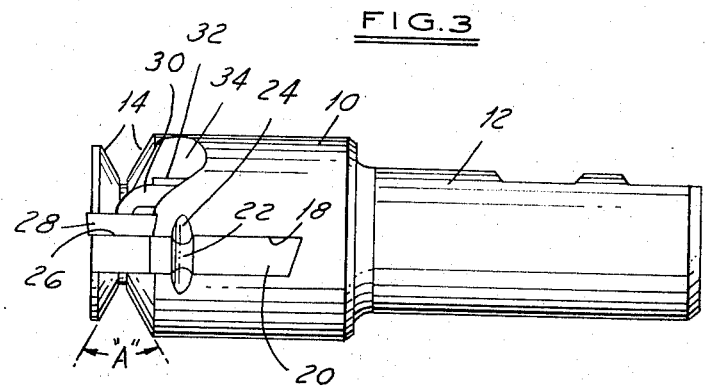
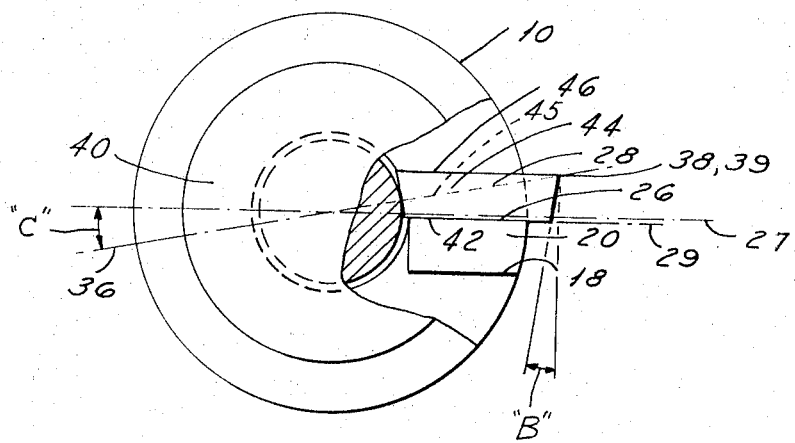

CUTTING TOOL

BACKGROUND OF THE INVENTION

The invention pertains to the field of milling cutters and end mills such as disclosed in U.S. Pat. Nos. 3,091,038; 2,648,893; 3,309,758 and 3,405,443. Other prior art includes cutters utilizing positive rake hexagonal indexable inserts with both negative axial and radial rake positioning and full side planar contact required to position the insert with sufficient clearance behind the working cutting edge. In the manufacture of such tools simplicity of construction and manufacturing in combination with the best accuracy possible together with extensive tool life for the cutting insert are the principal goals. It is important that such tools support the inserts in a manner adequate to prevent damage to the unused indexable insert cutting edges and the tool locating surfaces.

SUMMARY OF THE INVENTION

The cutting tool of the present invention comprises a circumferential groove having a pair of angularly related insert locating surfaces on the shank. Disposed about the shank are substantially radial slots containing flat plates transversely intersecting the circumferential groove. The flat plates are positioned to provide side flank locating contacts which prevent the cutting edges of positive rake inserts from contacting the angularly related locating surfaces of the groove while the insert is in seating contact with the flat plate. The included angle of the insert locating surfaces is determined by the included angle formed by the intersection of an axial-radial plane containing the cutting tip with the sides of the insert adjacent the locating surfaces.

DESCRIPTION OF THE DRAWINGS

FIG. 1 is an end view of the tool;

FIG. 2 is a side view of the tool taken in the direction 2 of FIG. 1;

FIG. 3 is a side view of the tool taken in the direction 3 of FIG. 1; and

FIG. 4 is a partial cutaway schematic end view of the tool of FIG. 1.

DESCRIPTION OF THE PREFERRED EMBODIMENT

In FIGS. 1–3 a tool body 10 includes a spindle end 12 suitably adapted for a conventional machine spindle (not shown). At the cutting end of the tool body 10 a circumferential V-groove 13 having conical locating surfaces 14 includes a circumferential bottom relief slot 16. A plurality of axially extending slots 18 are formed in the body 10 and a flat plate 20 is positioned in each groove 18. Each of the flat plates 20 includes a small groove 22 to allow permanent retention in the tool body 10 by staking, as indicated at 24. The surface of the flat plate 20 extending into the groove 13 provides a bottom seat 26 for an insert 28 secured in said groove 13 by a clamp member 30 and Allen head clamping screw 32 threaded into the tool body 10. A slot 34 is formed in the tool body 10 to accommodate the clamp 30 and clamping screw 32.

As shown, the inserts 28 are of indexable positive rake type and are positioned by the plate 20 and bottom seat 26 to provide negative radial rake angle cutting action as indicated in FIG. 4 by the radial line 36 extending through the working cutting edge 39 of the insert 28. The groove 13 is axially positioned to allow the cutting tip 38 of the insert 28 to extend slightly beyond the end 40 of the tool body 10. In FIG. 4, the slot 18 and plate 20 locate the bottom seat 26 slightly behind and parallel to an axial plane 27 as indicated by the extension 29. The bottom face 42 of the insert 29 is positioned against the seat 26. Each planar side face 44 of the insert contacts the conical groove preferably along dotted line 45 lying in a radial plane defined by line 36. The conical surfaces 14 also include straight lines which register with lines 45 and which extend toward the cone apex. Each non-working cutting edge 46 does not contact the surfaces of the groove 14 since the face plane of the insert including the cutting edges is displaced from the axial-radial plane 36 which engages with line contact 45 the insert sides 44. Thus the negative radial rake position for the triangular positive rake insert 28 protects the inactive insert cutting edges 46 from damaging locational engagement incident to cutting loads or otherwise when the insert is clamped in place. The positive rake angle of the insert 28 however is coordinated with the diameter of the groove 14, position of the bottom seat 26 and thickness of the insert. A greater diameter for the groove in relation to the thickness of the insert requires a smaller limiting positive rake angle. A bottom seat 26 positioned on a chordal plane located further behind the radial plane also decreases the allowable limiting positive rake angle of the insert. For the geometry described, with the bottom seat 26 approximately 0.020 inch behind a radial plane 27 as shown, a 1½ inch nominal cutting diameter tool, nominal 60° one-quarter inch IC triangular 10° positive rake inserts of one-eighth inch thickness provide an 8° negative radial rake angle and require a V-groove included angle of approximately 62°.

A standard 5° clearance angle triangular insert may be employed with a negative radial rake angle within the range of 3° to 8°.

In constructing the tool, it is apparent that the groove 13 may be formed by a simple lathe operation, and the slots 18 and 34 cut in with a simple slotting mill operation. The plates 20 are inserted and staked at 24 and a threaded hole drilled and tapped for each clamp screw 32. Preferably, the threaded hole for the clamp screw 32 passes through the plate 20 further assuring reliable retention of the plates 20 throughout the life of the tool.

Experimental tests utilizing the above cutter for deep roughing cuts have proven that the novel geometry above described prevents damage to the unused cutting edges 46 and the conical locating surfaces 14. The configuration above may be adapted to square hexagonal or other polygonal shapes of positive rake inserts to provide protection for the unused cutting edges.

The geometry of the cutting insert and holder can be understood from an explanation of the embodiment illustrated in FIG. 4 followed by consideration of the effect of optional variations.

The standard positive rake triangular 10° insert is oriented with its active cutting edge 38 parallel to the shank axis providing zero lead angle and zero axial rake. An 8° negative radial rake is defined by the angle between the cutting face 46 and axial plane 36 passing through the shank axis and cutting point. In order for the conical faces 14 to engage the side faces 44 along two lines of the axial plane 36 it will be seen that the included angle between side faces must be somewhat greater than 60° because the triangle formed by the intersection of plane 36 with the insert having its base along the cutting edge 38 will have a true height, as shown in FIG. 4, slightly less than the triangular face 46 having a common base. Such lesser height is a function of the clearance angle of the insert at the juncture of side faces 44 as seen at the innermost end of the insert in FIG. 4. The tangent of such angle for a 10° positive rake triangular insert is double the tangent of 10°. The exact included angle A between the conical faces 14 is a function of the 8° negative radial rake angle and 10° positive rake insert angle, is defined by and can be readily calculated from the following trigonometric formula:

$$\tan \tfrac{1}{2} A = \tan 30° \times \sin 8° \ (2 \tan 10° + 1/\tan 8)$$

whereby A equals slightly less than 62° (61.93).

The corresponding formula for a standard 5° positive rake triangular insert is:

$$\tan \tfrac{1}{2} A = \tan 30° \times \sin 8° \ (2 \tan 5° + 1/\tan 8°)$$

The effect of varying the 8° negative radial rake angle on the included conical face angle A may be seen from the following table:

| Neg. Rake Angle ° | 10° Positive Rake Insert | 5° Positive Rake Insert |
|---|---|---|
| 1 | 60.30 | 60.14 |
| 2 | 60.58 | 60.27 |
| 3 | 60.84 | 60.38 |
| 4 | 61.09 | 60.48 |
| 5 | 61.33 | 60.57 |
| 6 | 61.55 | 60.63 |
| 7 | 61.75 | 60.69 |
| 8 | 61.93 | 60.72 |
| 9 | 62.10 | 60.74 |
| 10 | 62.26 | 60.75 |
| 11 | 62.40 | 60.74 |
| 12 | 62.52 | 60.72 |

The preferred optional range of negative radial rake angle for a 10° positive rake insert extends from 4° to 12° to assure adequate displacement of locational engagement lines from the plane of the cutting edges.

It will be noted from the foregoing table that in the case of a 5° positive rake insert, variations in the required included angle A for corresponding variations in the negative rake angle are not as great as in the 10°, but again, a negative radial rake angle is preferred which will assure displacement of the plane of the insert cutting edges from the axial-radial plane of engagement.

I claim:

1. A cutting tool for indexable polygonal inserts comprising:
a shank member having an axis, a circumferential groove at one end of said shank member, said groove having two locating surfaces engaging sides of said insert, and a bottom seat providing means to locate an insert with its cutting face in a negative radial rake plane and its side engagement in and delineating a radial plane containing said axis divergent from said seat in a radially outward direction, and means for securing a cutting insert in operating engagement on said seat.

2. The cutting tool of claim 1 wherein the included angle between said insert side engaging locating surfaces is slightly greater than 60°.

3. The cutting tool of claim 1 wherein said insert locating surfaces and bottom seat provide means to locate a positive rake cutting insert with zero lead angle.

4. The cutting tool of claim 1 wherein said insert locating surfaces and bottom seat provide means to locate a positive rake insert with zero axial rake.

5. The cutting tool of claim 1 wherein said insert locating surfaces and bottom seat provide means to locate a positive rake cutting insert with its working cutting edge parallel to the axis of the tool.

6. The cutting tool of claim 1 wherein said groove provides common locating surfaces for a plurality of inserts.

7. The cutting tool of claim 6 wherein each bottom seat comprises a plate anchored in a slot in said shank member intersecting said groove.

8. The cutting tool of claim 7 wherein said groove comprises a pair of facing conical surfaces.

9. The cutting tool of claim 8 including indexable triangular positive rake inserts secured in cutting position.

10. The cutting tool of claim 9 wherein the included angle A between the conical surfaces is provided for inserts having a positive rake clearance angle B mounted with a negative radial rake angle C in accordance with the geometric configuration:

$$\tan (A/2) = \tan 30 \times \sin C \ (2 \tan B + 1/\tan C)$$

* * * * *